United States Patent Office 3,055,922
Patented Sept. 25, 1962

3,055,922
16-METHYL-17α-HYDROXY-3,20-DIKETOPREGNANES
Lawrence S. Levinson, Scotch Plains, N.J., assignor to Olin Mathieson Chemical Corporation, New York, N.Y., a corporation of Virginia
No Drawing. Filed Aug. 28, 1961, Ser. No. 134,083
2 Claims. (Cl. 260—397.45)

This invention relates to, and has for its objects the provisions of a method of preparing physiologically active steroids, and to the physiologically active steroids produced thereby.

It is known that various 16-methylated steroids of the 17α-hydroxy-3,20-diketo-Δ⁴-pregnene series are physiologically active substances which possess glucocorticoid and anti-inflammatory activities. It has now been found that if the A-ring of such steroids is saturated, thereby yielding corresponding 16-methylated steroids of the 17α-hydroxy-3,20-diketopregnane series, the topical anti-inflammatory activity of the starting Δ⁴-pregnene derivatives is surprisingly retained, although the systemic activity of these compounds is for all practical purposes eliminated. This discovery is unexpected, since a priori it would have been assumed that all anti-inflammatory activity, both systemic and topical, would be lost when the A-ring was saturated. Moreover, since the saturated pregnane steroids of this invention lack any significant systemic activity, they are compounds of choice for the topical treatment of such skin conditions as dermatitis, sunburn, neurodermatitis, eczema and anagenital pruritus. For these purposes they may be administered topically in the usually topically acceptable formulations, the dosage being adjusted for the relative activity of the particular steroid and the condition being treated.

Although the compounds of this invention include any 16-methyl-17α-hydroxy-3,20-diketopregnane steroid, the preferred compounds are those of the general formula

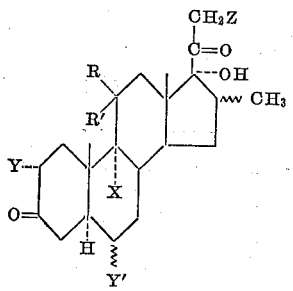

wherein R is hydrogen, R' is β-hydroxy, or together R and R' is keto; X is hydrogen, chloro, of fluoro; Y is hydrogen or methyl; Y' is in either the alpha or beta position and represents hydrogen, halogen (preferably chloro or fluoro) or lower alkyl (preferably methyl); and Z is hydrogen, chloro, fluoro, hydroxy or acyloxy. Particularly preferred are compounds wherein R is hydrogen, R' is β-hydroxy or together R and R' is keto; X is fluoro; Y is hydrogen; Y' is hydrogen or fluoro; and Z is hydroxy or acyloxy.

The compounds of this invention can be prepared in accordance with the method of this invention by hydrogenating the corresponding 16-methyl-17α-hydroxy-3,20-diketo steroids of the Δ⁴-pregnene (including the Δ¹,⁴-pregnadiene and Δ¹,⁴,⁶-pregnatriene) series. The reduction is accomplished by treatment with hydrogen in the presence of a hydrogenation catalyst such as a noble metal catalyst (e.g. palladium on a carrier or ruthenium on a carrier). The amount of hydrogen which will be absorbed depends of course on whether a pregnene, pregnadiene or pregnatriene is employed as the starting steroid. Thus, theoretically if a pregnene is used, one mole of hydrogen is absorbed per mole of steroid; a pregnadiene uses two moles of hydrogen per mole of steroid; and a pregnatriene, three moles of hydrogen per mole of steroid. Particularly preferred as starting steroidal materials for the process of this invention are steroids of the general formula

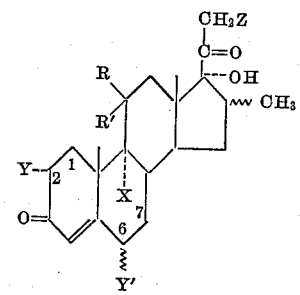

wherein the 1,2 and 6,7 positions are saturated or double-bonded and R, R', X, Y, Y' and Z are as hereinbefore defined.

Among the suitable starting steroids utilizable in the first process of this invention may be mentioned:

16α-methylhydrocortisone,
16β-methylhydrocortisone,
16α-methylcortisone,
16β-methylcortisone,
16α-methylprednisolone,
16β-methylprednisoline,
16α-methylprednisone,
9α-halo-16α-methylhydrocortisones (i.e. 9α-fluoro-16α-methylhydrocortisone, 9α-chloro-16α-methylhydrocortisone, 9α-bromo,16α-methylhydrocortisone and 9α-iodo-16α-methylhydrocortisone),
9α-halo-16α-methylcortisones,
9α-halo-16α-methylprednisolone (e.g. dexamethasone),
9α-halo-16α-methylprednisones,
9-α-halo-16β-methylhydrocortisones (e.g. 9α-fluoro-16β-methylhydrocortisone),
9α-halo-16β-methylcortisones (e.g. 9α-chloro-16β-methylcortisone),
9α-halo-16β-methylprednisolones (e.g. 9α-fluoro-16β-methylprednisolone),
9α-halo-16β-methylprednisones,
6α-16α-dimethylhydrocortisone,
6α-16α-dimethylcortisone,
6β,16β-dimethylprednisolone,
6α-16α-dimethylprednisone,
2α,16α-dimethylhydrocortisone,
2α-16β-dimethylcortisone,
2,16α-dimethylprednisolone,
2,16α-dimethylprednisone,
2α,6α,16α-trimethylhydrocortisone,
2α,6α,16α-trimethylcortisone,
9α-halo-2,16α-dimethylprednisolones (e.g. 2-methyldexamethasone),
9α-halo-6α,16α-dimethylhydrocortisones (e.g. 9α-fluoro-6α,16α-dimethylhydrocortisone),
9α-halo-6α,16α-dimethylprednisolones (e.g. 6α,16-methyldexamethasone),
16α-methyl-6-dehydrocortisone,
16α-methyl-6-dehydrohydrocortisone,
16α-methyl-6-dehydroprednisolone,
9α-halo-16α-methyl-6-dehydroprednisolones,
16α-methyl-11β,17α-dihydroxyprogesterone,
16α-methyl-11-keto-17α-hydroxyprogesterone,
16α-methyl-11β,17α-dihydroxy-1-dehydroprogesterone,
16α-methyl-11-keto-17α-hydroxy-1-dehydroprogesterone, 16α-methyl-9α-halo-11β,17α-dihydroxyprogesterones (e.g. 16α-methyl-9α-chloro-11β,17α-dihydroxyprogesterone and 16α-methyl 9α-fluoro-11β,17α-dihydroxyprogesterone),
16α-methyl 9α-halo-17α-hydroxy-11-keto-progesterones (e.g. 16α-methyl-9α-fluoro-17α-hydroxy-11-ketoprogesterone),
16α-methyl-9α-halo-11β-17α-dihydroxy-1-dehydroprogesterones (e.g. 16α-methyl-9α-fluoro-11β,17α-dihydroxy-1-dehydroprogesterone),
16β-methyl-9α-halo-11β,17α-dihydroxyprogesterones (e.g. 16β-methyl-9α-fluoro-11β,17α-dihydroxyprogesterone),
16β-methyl-9α-halo-11β,17α-dihydroxy-1-dehydroprogesterones (e.g. 16β-methyl-9α-fluoro-11β,17α-dihydroxy-1-dehydroprogesterone),
16α-methyl-21-halo-11β,17α-dihydroxyprogesterones (e.g. 16α-methyl-21-fluoro-11β,17α-dihydroxyprogesterone),
16α-methyl-21-halo-11β,17α-dihydroxy-1-dehydroprogesterones,
16α-methyl 9α,21-dihalo-11β,17α-dihydroxyprogesterones e.g. 16α-methyl-9α,21-difluoro-11β,17α-dihydroxyprogesterone),
9α,21-dihalo-6α,16α-dimethyl-11β,17α-hydroxy-1-dehydroprogesterones,
16α-hydroxy-6α-halo-16α-methylhydrocortisones (e.g. 6α-fluoro-16α-methylhydrocortisone and 6α-chloro-16α-methylhydrocortisone),
6α-halo-16α-methylcortisones,
6α-halo-16α-methylprednisolone,
6α-halo-16α-methylprednisone,
6α,9α-dihalo-16α-methylhydrocortisone (e.g. 6α,9α-difluoro-16α-methylhydrocortisone),
6α,9α-dihalo-16α-methylcortisone,
6α,9α-dihalo-16α-methylprednisolone (e.g. 6α,9α-difluoro-16α-methylprednisolone),
6α,9α-dihalo-16α-methylprednisone,
2α,16α-dimethyl-6α-fluoro-hydrocortisone,
2α,16α-dimethyl-6α-fluorocortisone,
16α-methyl-6α-fluoro-11β,17α-dihydroxyprogesterone,
16α-methyl-6α-fluoro-11-keto-17α-hydroxyprogesterone,
16α-methyl-6α-fluoro-11β,17α-dihydroxy-1-dehydroprogesterone,
16α-methyl-6α-fluoro-11-keto-17α-hydroxy-1-dehydroprogesterone,
16α-methyl 6α,9α-dihalo-11β,17α-dihydroxyprogesterone (e.g. 16α-methyl-6α,9α-difluoro-11β,17α-dihydroxyprogesterone),
16α-methyl-6α,9α-dihalo-11β,17α-dihydroxy-1-dehydroprogesterone (e.g. 16α-methyl-6α-9α,difluoro-11β,17α-dihydroxy-1-dehydroprogesterone),
16β-methyl-6α-halohydrocortisone (e.g. 16β-methyl 6α-fluoro-hydrocortisone),
16β-methyl-6α-halo-cortisone,
16β-methyl-6α-haloprednisolone,
16β-methyl 6α-halo-prednisone,
16β-methyl-6α,9α-dihalohydrocortisone (e.g. 16β-methyl-6α,9α-difluorohydrocortisone),
16β-methyl-6α,9α-dihalocortisone,
16β-methyl-6α,9α-dihaloprednisolone (e.g. 16β-methyl-6α-chloro-9α-fluoro-prednisolone),
16β-methyl-6α,9α-dihaloprednisone, and 21-esters of those compounds containing a 21-hydroxy group.

Among the suitable 21-esters can be mentioned those which are formed with the acyl radical of: (a) a hydrocarbon monocarboxylic acid of less than twelve carbon atoms, such as an alkanoic acid (e.g. acetic, propionic, tert.-pentanoic, enanthic, and undecanoic acid), a monocyclic aryl carboxylic acid (e.g. benzoic and toluic acid), a monocyclic aryl lower alkanoic acid (e.g., phenacetic and β-phenylpropionic acid), a lower alkenoic acid (e.g., undecenoic acid), a cycloalkane carboxylic acid, or a cycloalkenecarboxylic acid; (b) a hydrocarbon dicarboxylic acid of less than twelve carbon atoms, such as a lower alkanedioic acid (e.g., oxalic, malonic, succinic, glutaric, adipic, pimelic, suberic, azelaic and sebacic acid), a lower alkenedioic acid (e.g., maleic, fumaric and citraconic acid), a cycloalkanedioic acid, a cycloalkenedioic acid, and a monocyclic aromatic dicarboxylic acid (e.g., the phthalic acids), as well as salts thereof with suitable bases such as inorganic bases, such as ammonium hydroxide, the alkali metal hydroxides (e.g., potassium hydroxide and sodium hydroxide) and the alkaline earth metal hydroxides; and organic bases, such as di(lower alkyl)-amines and heterocyclic amines (e.g., pyridine); and (c) phosphoric acid.

The 21-esters can also be prepared from the corresponding 21-hydroxy-5α-pregnanes by treatment of the latter with an acyl halide (preferably acyl chloride) or acid anhydride of one of the hydrocarbon monocarboxylic acids of less than twelve carbon atoms mentioned hereinbefore, one of the hydrocarbon dicarboxylic acids of less than twelve carbon atoms mentioned hereinbefore, or phosphoric acid, the reaction being conducted under the usual acylating conditions.

The following examples illustrate the invention (all temperatures being in centigrade):

EXAMPLE 1

*9α-Fluoro-16α-Methyl-5α-Pregnane-11β,17α,21-Triol-3,20-Dione*

A suspension of 3 g. of 5% palladium on barium sulfate in 100 ml. of ethyl acetate is agitated in an atmosphere of hydrogen until hydrogen is no longer absorbed (120 ml.). To this suspension is added a suspension of 10 g. of dexamethasone in 900 ml. of ethyl acetate and the mixture agitated until hydrogen is no longer absorbed (1200 ml.). The mixture is filtered, washed well with ethyl acetate and hydrogenated again for 24 hours with 3 g. of fresh palladium on barium sulfate catalyst. Eighty-seven milliliters of hydrogen are taken up. The mixture is filtered and the solvent removed, in vacuo. The crude residue on recrystallization from acetonehexane furnishes analytically pure material in almost quantitative yield.

EXAMPLE 2

Following the procedure of Example 1 but substituting 10 g. of 9α-fluoro-16α-methylhydrocortisone for the dexamethasone the same product is formed in quantitative yield.

EXAMPLE 3

Following the procedure of Example 1 but substituting 10 g. of 9α-fluoro-16α-methyl-Δ$^{1,4,6}$-pregnatriene-11β,17α,21-triol-3,20-dione for the dexamethasone, the same product is formed.

EXAMPLE 4

*9α-Fluoro-16α-Methyl-5α-Pregnane-17α,21-diol-3,11,20-Trione*

Following the procedure of Example 1 but substituting 10 g. of 9α-fluoro-16α-methylcortisone for the dexamethasone, 9α-fluoro-16α-methyl-5α-pregnane-17α,21-diol-3,11,20-trione is obtained.

EXAMPLE 5

*16α-Methyl-5α-Pregnane-11β,17α,21-Triol-3,20-Dione*

Following the procedure of Example 1 but substituting 10 g. of 16α-methylprednisolone for the dexamethasone, 16α-methyl-5α-pregnane-11β,17α,21-triol-3,20-dione is obtained.

EXAMPLE 6

*16α-Methyl-9α-Chloro-5α-Pregnane-17α,21-Diol-3,11,20-Trione*

Following the procedure of Example 1 but substituting 10 g. of 16α-methyl-9α-chloro-16α-hydroxycortisone for the dexamethasone, 16α-methyl-9α-chloro-5α-pregnane-17α,21-diol-3,11,20-trione is obtained.

EXAMPLE 7

*16β-Methyl-9α-Fluoro-5α-Pregnane-11β,17α,21-Triol-3,20-Dione*

Following the procedure of Example 1 but substituting 10 g. of 16β-methyl-9α-fluoro prednisolone for the dexamethasone, 16β-methyl-9α-fluoro-5α-pregnane-11β,17α,21-triol-3,20-dione is obtained.

EXAMPLE 8

*9α-Fluoro-16α-Methyl-5α-Pregnane-11β,17α-Diol-3,20-Dione*

Following the procedure of Example 1 but substituting 10 g. of 16α-methyl-9α-fluoro-Δ⁴-pregnene,11β,17α-diol-3,20-dione for the dexamethasone, 9α-fluoro-16β-methyl-5α-pregnane-11β,17α-diol-3,20-dione is obtained.

EXAMPLE 9

*9α-Fluoro-16β-Methyl-5α-Pregnane-11β,17α-Diol-3,20-Dione*

Following the procedure of Example 1 but substituting 10 g. of 16β-methyl-9α-fluoro-Δ⁴-pregnene-11β,17α-diol-3,20-dione for the dexamethasone, 9α-fluoro-16β-methyl-5α-pregnane-11β,17α-diol-3,20-dione is obtained.

EXAMPLE 10

*6α,16α-Dimethyl-5α-Pregnane-11β,17α,21-Triol-3,20-Dione*

Following the procedure of Example 1 but substituting 10 g. of 6α,16α-dimethylprednisolone for the dexamethasone, 6α,16α-dimethyl-5α-pregnane-11β,17α-21-triol-3,20-dione is obtained.

EXAMPLE 11

*6α,16α-Dimethyl-9α-Fluoro-5α-Pregnane-11β,17α,21-Triol-3,20-Dione*

Following the procedure of Example 1 but substituting 10 g. of 6α,16α-dimethyl-9α-fluoro-prednisolone for the dexamethasone, 6α,16α-dimethyl-9α-fluoro-5α-pregnane-11β,17α,21-triol-3,20-dione is obtained.

EXAMPLE 12

*16β-Methyl-5α-Pregnane-11β,17α,21-Triol-3,20-Dione*

Following the procedure of Example 1 but substituting 10 g. of 16β-methylprednisolone for the dexamethasone, 16β-methyl-5α-pregnane-11β,17α,21-triol-3,20-dione is obtained.

EXAMPLE 13

*16β-Methyl-9α-Chloro-5α-Pregnane-17α,21-Diol-3,11,20-Trione*

Following the procedure of Example 1 but substituting 10 g. of 16β-methyl-9α-chlorocortisone for the dexamethasone, 16β-methyl-9α-chloro-5α-pregnane-17α,21-diol-3,11,20-trione is obtained.

EXAMPLE 14

*6β,16β-Dimethyl-5α-Pregnane-11β,17α,21-Triol-3,20-Dione*

Following the procedure of Example 1 but substituting 10 g. of the acetophenone derivative of 6β,16β-dimethyl-prednisolone for the dexamethasone, 6β,16β-dimethyl-5α-pregnane-11β,17α,21-triol-3,20-dione is obtained.

EXAMPLE 15

*9α-Fluoro-6α,16β-Dimethyl-5α-Pregnane-11β,17α,21-Triol-3,20-Dione*

Following the procedure of Example 1 but substituting 10 g. of 9α-fluoro-6α,16β-dimethyl-prednisolone for dexamethasone, 9α-fluoro-6α-16β-dimethyl-5α-pregnane-11β,17α,21-triol-3,20-dione is obtained.

EXAMPLE 16

*16α-Methyl-9α-Chloro-5α-Pregnane-11β,17α-Diol-3,20-Dione*

Following the procedure of Example 1 but substituting 10 g. of 16α-methyl-9α-chloro-11β,17α-dihydroxyprogesterone for the dexamethasone, 16α-methyl-9α-chloro-5α-pregnane-11β,17α-diol-3,20-dione is obtained.

EXAMPLE 17

*16α-Methyl-9α-Fluoro-5α-Pregnane-17α-Ol-3,11,20-Trione*

Following the procedure of Example 1 but substituting 10 g. of 16α-methyl-9α-fluoro-Δ⁴-pregnene-17α-ol-3,11,20-trione for the dexamethasone, 16α-methyl-9α-fluoro-5α-pregnane-17α-ol-3,11,20-trione is obtained.

EXAMPLE 18

*9α-Fluoro-16α-Methyl-5α-Pregnane-11β,17α,21-Triol-3,20-Dione 21-Acetate*

Following the procedure of Example 1 but substituting 10 g. of dexamethasone 21-acetate for the dexamethasone, 9α-fluoro-16α-methyl-5α-pregnane-11β,17α,21-triol-3,20-dione 21-acetate is obtained.

EXAMPLE 19

*16α-Methyl-9α-Fluoro-5α-Pregnane-11β,17α,21-Triol-3,20-Dione 21-Hemisuccinic Acid*

Following the procedure of Example 1 but substituting 10 g. of dexamethasone 21-hemisuccinic acid for the dexamethasone, 16α-methyl-9α-fluoro-5α-pregnane-11β,17α,21-triol-3,20-dione 21-hemisuccinic acid is obtained.

EXAMPLE 20

*16α-Methyl-9α-Fluoro-5α-Pregnane-11β,17α,21-Triol-3,20-Dione 21-Sodium Hemisuccinate*

(a) *Preparation of 16α-methyl-9α-fluoro-5α-pregnane 11β,17α,21-triol-3,20-dione 21-hemisuccinic acid.*—A solution of 4 g. of 16α-methyl-9α-fluoro-5α-pregnane 11β,17α,21-triol-3,20-dione and 8 g. of succinic anhydride in 40 ml. of anhydrous pyridine is heated at 60° for two hours. After cooling to 15°, 20 g. of ice is added and the mixture poured slowly with stirring onto 150 ml. of crushed ice, containing 16 ml. of concentrated sulfuric acid. The resulting precipitate of the 21-hemisuccinic acid is filtered and washed well with water until free from sulfuric acid.

(b) *Preparation of 16α-methyl-9α-fluoro-5α-pregnane-11β,17α,21-triol-3,20-dione 21-sodium hemisuccinate.*— 500 mg. of the 21-hemisuccinic acid obtained in step *a* is dissolved in a minimum of 95% alcohol and the resulting solution is neutralized with 0.1 N sodium hydroxide solution. The neutralized solution is freed from alcohol in vacuo, extracted with chloroform to remove residual unneutralized acid and the aqueous solution lyophilized in high vacuum. The residual material represents the pure sodium salt.

EXAMPLE 21

*16α-Methyl-9α-Fluoro-5α-Pregnane-11β,17α,21-Triol-3,20-Dione 21-Sodium o-Hemiphthalate*

Following the procedure of Example 20 but substituting 10 g. of phthalic anhydride for the succinic anhydride in step *a*, there is obtained 16α-methyl-9α-fluoro-5α-pregnane-11β,17α,21-triol-3,20-dione 21-sodium-o-hemiphthalate.

EXAMPLE 22

*16α-Methyl 9α-Fluoro-5α-Pregnane-11β,17α,21-Triol-3, 20-Dione 21-Potassium Hemiglutarate*

Following the procedure of Example 20 but substituting 10 g. of glutaric anhydride for the succinic anhydride in step *a*, and 0.1 N aqueous potassium hydroxide for the sodium hydroxide in step *b*, there is obtained 16α-methyl 9α-fluoro-5α-pregnane-11β,17α,21-triol-3,20-dione 21-potassium hemiglutarate.

EXAMPLE 23

*16α-Methyl 9α,21-Dfluoro-5α-Pregnane-11β,17α,Diol-3, 20-Dione*

Following the procedure of Example 1 but substituting 10 g. of 16α-methyl-9α,21-difluoro-Δ$^{1,4}$-pregnadiene-11β, 17α-diol-3,20-dione for the dexamethasone, 16α-methyl-9α,21-difluoro-5α-pregnane-11β,17α-diol-3,20-dione is obtained.

EXAMPLE 24

*16α-Methyl-9α-Fluoro-21-Chloro-5α-Pregnane-11β,17α-Diol-3,20-Dione*

Following the procedure of Example 1 but substituting 10 g. of 16α-methyl-9α-fluoro-21-chloro-Δ$^{1,4}$-pregnadiene-11β,17α-diol-3,20-dione for the dexamethasone, 16α-methyl-9α-fluoro-21-chloro-5α-pregnane-11β,17α-diol-3, 20-dione is obtained.

EXAMPLE 25

*Bis-(16α-Methyl 9α-Fluoro-5α-Pregnane-11β,17α,21-Triol-3,20-Dione) 21,21'-Sulfite*

Following the procedure of Example 1 but substituting 10 g. of bis-dexamethasone 21,21'-sulfite for the dexamethasone, bis-(16α-methyl 9α-fluoro-5α-pregnane-11β, 17α,21-triol-3,20-dione) 21,21'-sulfite is obtained.

EXAMPLE 26

*Bis-(16α-Methyl 9α-Fluoro-5α-Pregnane-11β,17α,21-Triol-3,20-Dione) 21,21'-Carbonate*

Following the procedure of Example 1 but substituting 10 g. of bis-dexamethasone 21,21'-carbonate for the dexamethasone, bis-(16α-methyl 9α-fluoro-5α-pregnane-11β, 17α-21-triol-3,20-dione) 21,21'-carbonate is obtained.

EXAMPLE 27

*Bis-(16α-Methyl 9α-Fluoro-5α-Pregnane-11β,17α,21-Triol-3,20-Dione) 21,21'-Sulfate*

Following the procedure of Example 1 but substituting 10 g. of bis-dexamethasone 21,21'-sulfate for the dexamethasone, bis-(16α-methyl 9α-fluoro-5α-pregnane-11β, 17α,21-triol-3,20-dione) 21,21'-sulfate is obtained.

EXAMPLE 28

*Bis-(16α-Methyl-9α-Fluoro-5α-Pregnane-11β,17α,21-Triol-3,20-Dione) 21,21'-Phenylphosphonate*

Following the procedure of Example 1 but substituting 10 g. of bis-dexamethasone 21,21'-phenylphosphonate for the dexamethasone, bis(16α,methyl-9α-fluoro-5α-pregnane-11β,17α,21-triol-3,20-dione) 21,21'-phenylphosphonate is obtained.

EXAMPLE 29

*16α-Methyl-9α-Fluoro-5α-Pregnane-11β,17α,21-Triol-3,20-Dione 21-Potassium Phosphate*

To a mixture of 3 ml. of anhydrous pyridine and 0.15 ml. of phosphorous oxychloride maintained at −15° is added dropwise over a ten minute period a solution of 200 mg. of 16α-methyl-9α-fluoro-5α-pregnane-11β,17α,21-triol-3,20-dione in 3 ml. of pyridine. The resulting solution is allowed to remain at −15° for an additional 20 minutes at which time 0.2 ml. of water is added and the mixture is allowed to warm up to room temperature. One hour after the addition of water, the solution is concentrated in vacuo to about 2 ml., diluted with 10 ml. of water, extracted with chloroform and adjusted to a pH of 6.8 with potassium carbonate solution. The neutralized solution is lyophilized, triturated with alcohol and the alcoholic solution concentrated to small volume. The potassium salt of 16α-methyl 9α-fluoro-5α-pregnane-11β,-17α,21-triol-3,20-dione 21-phosphate crystallizes under these conditions.

EXAMPLE 30

*16α-Methyl-6α,9α-Difluoro-5α-Pregnane-11β,17α,21-Triol-3,20-Dione*

Following the procedure of Example 1 but substituting 10 g. of 6α-fluoro-dexamethasone for the dexamethasone, 16α-methyl - 6α,9α- difluoro-5α-pregnane-11β,17α,21-triol-3,20-dione is obtained.

EXAMPLE 31

*16α-Methyl-6α,9α-Difluoro-5α-Pregnane-11β,17α,21-Triol-3,20-Dione 21-Acetate*

Following the procedure of Example 1 but substituting 10 g. of 6α-fluorodexamethasone 21-acetate for the dexamethasone, 16α-methyl 6α,9α-difluoro-5α-pregnane-11β,-17α,21-triol-3,20-dione 21-acetate is obtained.

EXAMPLE 32

*16α-Methyl-6β,9α-Difluoro-5α-Pregnane-11β,17α,21-Triol-3,20-Dione*

Following the procedure of Example 1 but substituting 10 g. of 6β-fluorodexamethasone for the dexamethasone, 16α-methyl-6β,9α-difluoro-5α-pregnane- 11β, 17α, 21-triol-3,20-dione is obtained.

EXAMPLE 33

*16β-Methyl-6α,9α-Difluoro-5α-Pregnane-11β,17α,21-Triol-3,20-Dione*

Following the procedure of Example 1 but substituting 10 g. of 16β-methyl-6α,9α-difluoro prednisolone for the dexamethasone, 16β-methyl-6α,9α-difluoro prednisolone for the dexamethasone, 16β-methyl-6α,9α-difluoro-5α-pregnane-11β,17α,21-triol-3,20-dione is obtained.

EXAMPLE 34

*16α-Methyl 6α-Chloro-9α-Fluoro-5α-Pregnane-11β,17α, 21-Triol-3,20-Dione*

Following the procedure of Example 1 but substituting 10 g. of 16α-methyl-6-chloro-9α-fluorohydrocortisone for the dexamethasone, 16α-methyl-6α-chloro-9α-fluoro-5α-pregnane-11β,17α,21-triol-3,20-dione is obtained.

The invention may be variously otherwise embodied within the scope of the appended claims.

What is claimed is:

1. A compound selected from the group consisting of steroids of the general formula

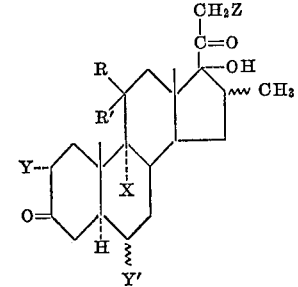

wherein R is hydrogen, R' is β-hydroxy and together R and R' is keto; X is selected from the group consisting of chloro and fluoro; Y is selected from the group consisting of hydrogen and methyl; Y' is halogen; and Z is selected from the group consisting of hydrogen, chloro, fluoro, hydroxy and the acyloxy radicals of a hydrocarbon mono- and dicarboxylic acids of less than twelve carbon atoms.

2. 16α-methyl-6α,9α-difluoro-5α-pregnane-11β,17α,21-triol-3,20-dione.

References Cited in the file of this patent

UNITED STATES PATENTS 2,935,511    Taub et al. _____ May 3, 1960
2,967,179    Arkley et al. _____ Jan. 3, 1961

FOREIGN PATENTS 780,916    Great Britain _____ Aug. 7, 1957

OTHER REFERENCES

Chemerada et al., J.A.C.S. 73, 4052–4053 (1951).
Loewenthal, Tetrahedron, vol. 6, No. 4, June 1959, pp. 269–303.